Patented Mar. 28, 1944

2,345,094

UNITED STATES PATENT OFFICE 2,345,094

ORGANIC CYANINE BASE

Leslie G. S. Brooker and Robert H. Sprague, Rochester, N. Y., assignors to Eastman Kodak Company, Rochester, N. Y., a corporation of New Jersey No Drawing. Original application April 18, 1941, Serial No. 389,224. Divided and this application January 26, 1942, Serial No. 428,212

12 Claims. (Cl. 260—240)

This invention relates to organic bases and more particularly to what can be called cyanine bases, dialkylaminostyryl bases and dialkylaminophenylbutadienyl bases.

Cyanine bases, dialkylaminostyryl bases and dialkylaminophenylbutadienyl bases have been prepared by removing the elements of alkyl salt (i. e. by dequaternarizing) cyanine dyes, dialkylaminostyryl dies and dialkylaminophenylbutadienyl dyes. This has been accomplished, for instance, by heating the dyes in a tertiary amine, such as diethylaniline. However, this method is of limited utility since many of the bases which contain longer polymethine chains cannot be prepared by such a process.

Cyanine bases have also been prepared by condensing lepidine or quinaldine with cyclammonium quaternary salts containing, in a reactive position, a thioether or a β-acylarylaminovinyl group. This method is of no utility for the preparation of di- and tricarbocyanine bases, and in any event, is useful only for producing bases containing quinoline nuclei.

We have now found that a new kind of cyanine bases, dialkylaminostyryl bases and dialkylaminophenylbutadienyl bases can be prepared by condensing heterocyclic nitrogen bases containing in the alpha or gamma position, i. e. in one of the so-called reactive positions, a cyanomethyl group, with cyclammonium quaternary salts containing in a reactive position a group, such as halogen, thioether, β-arylaminovinyl, ω-arylamino-1,3-butadienyl or β - arylamino-1,3,5 - hexatrienyl. By our new method we can obtain readily cyanine bases containing long polymethine chains. Our new bases always contain a cyano group attached to one of the methine groups connecting the two cyclic nuclei, and are frequently much stronger sensitizers of photographic emulsions than the corresponding bases which are devoid of cyano groups. We have also found that bases devoid of cyano groups can be prepared from our new bases which contain a cyano group. Thus, we have provided many bases which were heretofore unavailable.

It is accordingly an object of our invention to provide new organic bases. A further object is to provide a process for preparing organic bases. Other objects will become apparent hereinafter.

In accordance with our invention, we prepare cyano cyanine bases by condensing a heterocyclic nitrogen base containing in a reactive position a cyanomethyl group, with a cyclammonium quaternary salt containing in a reactive position a member selected from the group consisting of halogen atoms, thioether groups, β-arylaminovinyl (including acylated β-arylaminovinyl) groups, ω-arylamino-1,3-butadienyl (including acylated ω-arylamino-1,3-butadienyl) groups, ω-arylamino-1,3,5-hexatrienyl (including acylated ω-arylamino-1,3,5-hexatrienyl) groups. Advantageously the condensations are effected in the presence of a basic condensing agent. Tertiary organic basic condensing agents are advantageously employed especially with cyclammonium quarternary salts containing a halogen atom or a thioether group. Strong organic bases, i. e. those having a dissociation constant substantially greater than that of pyridine, are advantageously employed. When employing strong organic bases, it is advantageous to effect the condensations in a solvent, such as an alcohol of the formula $C_nH_{2n+1}OH$ wherein $n$ represents a positive integer of from one to three, for example. Heat accelerates the condensation.

The following examples will serve to illustrate our new cyanine bases and the manner of obtaining the same.

EXAMPLE 1.—2-[cyano (1-ethyl-4(1)-quinolylidene) methyl] quinoline and its hydrochloride

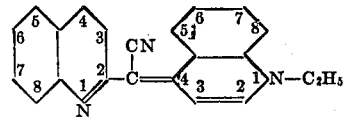

7.86 g. (1 mol.) of 4-phenylmercaptoquinoline ethiodide, 3.36 g. (1 mol.) of 2-quinolylacetonitrile and 2.0 g. (1 mol.) of triethylamine were placed in 25 cc. of absolute ethyl alcohol. The mixture was boiled, under reflux, for 10 minutes. The orange reaction mixture was cooled and stirred with 150 cc. of a 4% aqueous solution of sodium hydroxide. The aqueous liquors were decanted from the sticky brown precipitate. The precipitate was dissolved in 100 cc. of hot ethyl alcohol. The solution was filtered while hot, and the cyanine base precipitated as its hydrochloride by adding to the filtered solution, 10 cc. of an alcoholic solution of hydrogen chloride (.15 gram of hydrogen chloride per cc.). Coppery crystals of the base separated at once. The mixture was then diluted to 200 cc. with acetone. The acetone mixture was chilled and filtered. In this manner a 72% yield of the hydrochloride was obtained. It was recrystallized from absolute ethyl alcohol (20 cc. per gram of hydrochloride) and obtained, in 62% yield, as brilliant coppery-red crystals melting with decomposition at 158° to 160° C.

1.0 g. (1 mol.) of the coppery-red crystals and 0.6 g. (1 mol.+100% excess) of triethylamine were stirred together in 10 cc. of absolute ethyl alcohol until solution was complete. The mixture was then poured into 300 cc. of water, whereupon the cyanine base precipitated. The base was filtered off by suction. Yield 0.8 g., 89%. The base was recrystallized from absolute ethyl alcohol and obtained as minute red crystals having a green reflex and melting with decomposition at 151° to 152° C. Yield 0.6 g., 67%. The base slightly sensitized a photographic silver halide emulsion. The hydrochloride of the base, on the other hand, did not sensitize photographic silver halide emulsions. The base gave a yellow-orange solution in methyl alcohol, while the hydrochloride gave a bluish red solution.

4-quinolylacetonitrile can be prepared according to the method of Borsche and Bütschli, described in Ann. 529, 271 (1937).

EXAMPLE 2.—2-[cyano-(3-ethyl - 2(3) -benzothiazolylidene) methyl] benzothiazole

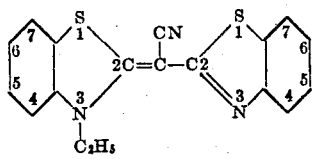

6.4 g. (1 mol.) of 2-ethylmercaptobenzothiazole ethiodide, 3.5 g. (1 mol.) of 2-benzothiazolylacetonitrile and 2.0 g. (1 mol.) of triethylamine were placed in 100 cc. of absolute ethyl alcohol. The mixture was boiled, under reflux, for 15 minutes. Nearly colorless crystals of the base separated at once from the boiling mixture. The mixture was chilled, the base filtered off, washed with methyl alcohol and dried in the air. Yield of pale yellow crystals was 5.7 g., 85%. The base was recrystallized from acetone (75 cc. per gram of base) and obtained as glistening pale yellow needles, melting with decomposition at 219° to 221° C. Yield 4.7 g., 70%. The base gave a pale yellow solution in methyl alcohol. The base sensitized a gelatino-silver-chloride emulsion slightly to 415 mu.

2-benzothiazolylacetonitrile can be prepared according to the method described by Borsche and Doeller, Ann. 537 54 (1938).

EXAMPLE 3.—2-[1-cyano-3-(1-ethyl-4(1)-quinolylidene) propenyl] benzothiazole

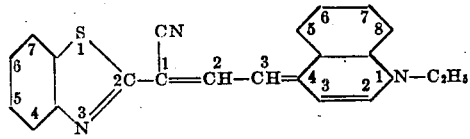

1.0 g. (1 mol.) of 2-benzothiazolylacetonitrile, 2.55 g. (1 mol.) of 4-(β-acetanilidovinyl)-quinoline ethiodide and 0.6 g. (1 mol.) of triethylamine were placed in 25 cc. of absolute ethyl alcohol. The mixture was boiled, under reflux, for 5 minutes. Green crystals of cyanine base separated immediately from the purplish reaction mixture. The mixture was chilled, the base filtered off, the base washed with methyl alcohol and dried in the air. Yield of green crystals was 1.8 g., 89%. After recrystallization from acetone (125 cc. per gram of base), the base was obtained as minute green crystals, melting with decomposition at 222° to 223° C. Yield 1.5 g., 74%. The base sensitized a photographic gelatino-silver-bromiodide emulsion fairly strongly between about 520 and about 680 mu, with a maximum at about 635 mu. The base gave a blue solution in methyl alcohol.

EXAMPLE 4.—2-[1-cyano-3-(3-ethyl-2(3)-benzoxazolylidene) propenyl]-quinoline

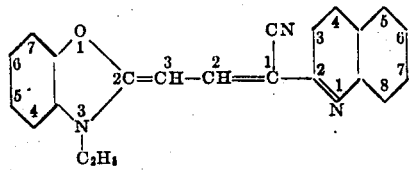

1.7 g. (1 mol.) of 2-quinolylacetonitrile, 4.34 g. (1 mol.) of 2-(β-acetanilidovinyl)-benzoxazole ethiodide and 1.0 g. (1 mol.) of triethylamine were placed in 15 cc. of absolute ethyl alcohol. The mixture was boiled, under reflux, for 10 minutes. The orange mixture was chilled, the base filtered off, the base washed with a small amount of absolute ethyl alcohol and dried in the air. The yield of orange crystals was 2.8 g., 82%. After recrystallization from acetone (165 cc. per gram of base), the base was obtained as minute orange crystals, melting at 231° to 232° C. Yield 2.7 g., 79%. The base sensitized a photographic gelatino-silver-bromiodide emulsion very weakly out to about 560 mu, with some desensitization in the blue region. The base gave a yellow solution in methyl alcohol.

EXAMPLE 5.—2-[1-cyano-3-(3 - methyl-2(3) - thiazolinylidene) propenyl] quinoline

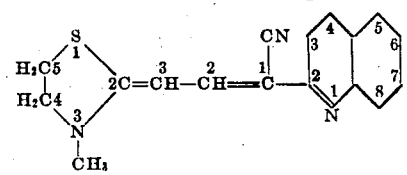

1.7 g. (1 mol.) of 2-quinolylacetonitrile, 3.9 g. (1 mol.) of 2-(β-acetanilidovinyl)-thiazoline methiodide and 1.0 g. (1 mol.) of triethylamine were placed in 15 cc. of absolute ethyl alcohol. The mixture was boiled, under reflux, for 10 minutes. The orange reaction mixture was chilled, the cyanine base was filtered off, the cyanine base washed with absolute ethyl alcohol and dried in the air. Yield of orange crystals was 2.9 g., 99%. After recrystallization from absolute ethyl alcohol (79 cc. per gram of base), the base was obtained, in 65% yield, as brown needles having a metallic reflex and melting with decomposition at 174° to 175° C. The base sensitized a photographic gelatino-silver-bromiodide emulsion very weakly out to about 560 mu, with considerable desensitization in the blue region. The base gave a yellow solution in methyl alcohol.

EXAMPLE 6.—2-[1-cyano-3-(3-ethyl-2(3)-benzothiazolylidene) propenyl] quinoline

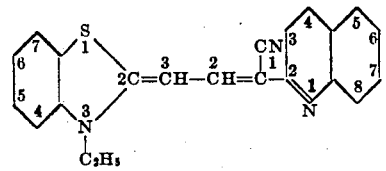

4.5 g. (1 mol.) of 2-(β-acetanilidovinyl)-benzothiazole ethiodide and 1.7 g. (1 mol.) of 2-quinolylacetonitrile were placed in 15 cc. of pyridine. The mixture was boiled, under reflux, for 3 minutes. The orange reaction mixture was cooled, diluted to 100° C. with water and chilled to 0° C. The aqueous liquors were decanted and the tarry residue was stirred with methyl alcohol until crystalline. The crystalline cyanine base was filtered off, washed with water, then with methyl alcohol, and then dried in the air. 3.0 g., 85% yield, of a reddish brown powder were thus obtained. After recrystallization from methyl alcohol (250 cc. per gram of base), the base was obtained as red needles, having a green reflex and melting with decomposition at 175° to 176° C. Yield 2.0 g., 56%. The base sensitized a photographic gelatino-silver-bromiodide emulsion weakly out to about 620 mu.

2-quinolylacetonitrile can be prepared according to the method of Borsche and Manteuffel, Ann. 526, 36 (1936).

In a similar manner, 4-[1-cyano-3-(3-ethyl-2(3)-benzothiazolylidene)propenyl] quinoline was obtained from 4-quinolylacetonitrile, in 45% yield, as red crystals, melting with decomposition at 188° to 190° C. This base sensitized a photographic gelatino-silver-bromiodide emulsion strongly out to 660 mu with a maximum of 540 mu.

EXAMPLE 7.—2-[1-cyano-5-(1-ethyl-4(1)-quinolylidene)-1,3-pentadienyl]-benzothiazole

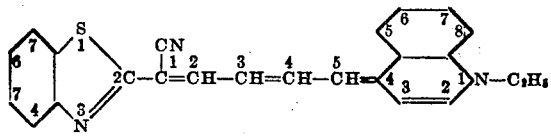

1.74 g. (1 mol.) of 2-benzothiazolylacetonitrile, 4.7 g. (1 mol.) of 4-(4-acetanilido-1,3-butadienyl) quinoline ethiodide and 1.0 g. (1 mol.) of triethylamine were placed in 50 cc. of absolute ethyl alcohol. The mixture was boiled, under reflux, for 5 minutes. The cyanine base separated at once from the boiling mixture. The reaction mixture was chilled, the base filtered off, the base washed with methyl alcohol and dried in the air. Yield of dark green crystals was 3.0 g. This crude product was very impure. The desired base was obtained by extracting the crude product with 800 cc. of acetone and concentrating the 800 cc. to 150 cc. and chilling to 0° C. In this manner 1.2 g., 32% yield, of green crystals were obtained. After recrystallization from acetone (125 cc. per gram of base), the base was obtained as green needles melting at 201° to 203° C. with decomposition. Yield 0.6 g., 16%. The base sensitized a photographic gelatino-silver-bromiodide emulsion strongly from about 680 mu to about 780 mu with a maximum at 740 mu. The base gave a blue solution in methyl alcohol.

EXAMPLE 8.—2-[1-cyano-5-(1-ethyl-2(1)-quinolylidene)-1,3-pentadienyl]benzothiazole

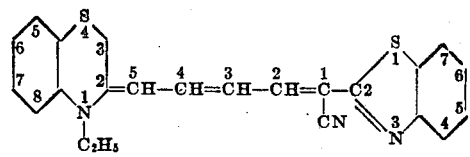

1.74 g. (1 mol.) of 2-benzothiazolylacetonitrile, 4.7 g. (1 mol.) of 2-(4-acetanilido-1,3-butadienyl) quinoline ethiodide and 1.0 g. (1 mol.) of triethylamine were placed in 50 cc. of absolute ethyl alcohol. The mixture was boiled, under reflux, for 5 minutes. The cyanine base separated at once from the boiling mixture. The mixture was chilled, the base filtered off, the base washed with methyl alcohol and dried in the air. Yield of green crystals 3.8 g., 100%. After recrystallization from acetone (300 cc. per g. of base), the base was obtained, in 58% yield, as green crystals melting at 230° to 233° C. with decomposition. The base sensitized a photographic gelatino-silver-bromiodide emulsion strongly from 580 to 740 mu with a maximum at 640 mu. The base gave a blue solution in methyl alcohol.

EXAMPLE 9.—4-[1-cyano-5-(3-ethyl-2-(3)-benzothiazolylidene)-1,3-pentadienyl] quinoline

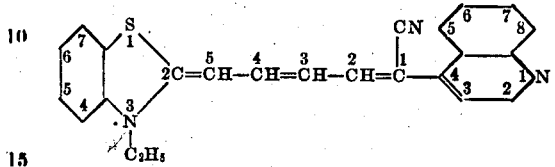

4.8 g. (1 mol.) of 2-(4-acetanilido)-1,3-butadienyl-benzothiazole ethiodide, 1.7 g. (1 mol.) of 4-quinolylacetonitrile and 1.0 g. (1 mol.) of triethylamine were placed in 25 cc. of absolute ethyl alcohol. The mixture was boiled, under reflux, for 5 minutes. The red mixture was then cooled and diluted with 75 cc. of water. The diluted mixture was chilled to 0° C. and the aqueous liquors were decanted. The residual green tar was stirred with 25 cc. of hot acetone until completely crystalline. The acetone mixture was chilled, the crystalline cyanine base filtered off and washed with acetone. Yield 1.9 g., 50%. After recrystallization from acetone (100 cc. per gram of base), the cyanine base was obtained as steel blue needles, melting with decomposition at 185° to 187° C. The base sensitized a photographic gelatino-silver-bromiodide emulsion feebly out to 670 mu.

EXAMPLE 10.—2-[1-cyano-7-(3-ethyl-2(3)-benzothiazolylidene)-1,3,5-heptatrienyl] benzothiazole

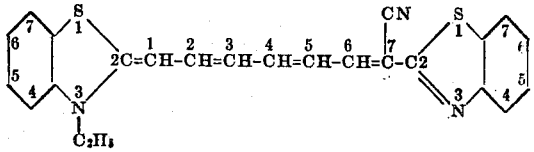

1.74 g. (1 mol.) of 2-benzothiazolylacetonitrile, 5.0 g. (1 mol.) of 2-6-acetanilido (1,3,5-hexatrienyl) benzothiazole ethiodide and 1.0 g. (1 mol.) triethylamine were placed in 25 cc. of absolute ethyl alcohol. The mixture was boiled, under reflux, for 5 minutes. The cyanine base separated at once from the boiling mixture. The mixture was chilled, the base filtered off, washed with methyl alcohol and dried in the air. Yield of copper bronze crystals was 3.3 g. This crude product was very impure. The base was obtained by extracting the crude product with 900 cc. of acetone, concentrating the acetone extract to 25 cc. and chilling to 0° C. In this manner 1.0 g., 24% yield, of green crystals was obtained. After recrystallization from acetone (140 cc. per gram of base), the base was obtained as minute blue crystals melting with decomposition at 193° to 195° C. Yield 0.7 g., 17%. This base sensitized a photographic gelatino-silver-bromiodide emulsion strongly from 600 to 820 mu with a maximum at 760 mu. The base gave a blue solution in methyl alcohol.

EXAMPLE 11.—4-[1-cyano-3-(1-ethyl-4(1)-quinolylidene) propenyl] quinoline

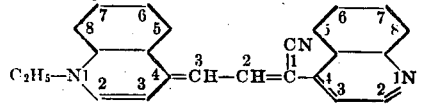

4.5 g. (1 mol.) of 4-(β-acetanilidovinyl-quinoline-ethiodide, 1.7 g. (1 mol.) of 4-quinolylacetonitrile and 1.0 g. (1 mol.) of triethylamine were placed in 15 cc. of absolute ethyl alcohol. The mixture was boiled, under reflux, for 5 minutes. The red mixture was cooled, diluted with 75 cc. of water, and the diluted mixture chilled to 0° C. The tar remaining after decanting the aqueous liquors, was stirred with 25 cc. of hot acetone until crystalline. The acetone mixture was chilled, the crystalline base filtered off and washed with acetone. Yield 3 g., 86%. After recrystallization from methyl alcohol (115 cc. per gram of base), the base was obtained, in 67% yield, as green crystals having a green reflex and melting at 178° to 180° C. with decomposition. The base gave a bluish red methyl alcoholic solution and sensitized a gelatino-silver-bromiodide emulsion slightly.

EXAMPLE 12.—2-[1-cyano-3-(3-ethyl - 2(3) - benzothiazolylidene) propenyl]-benzothiazole

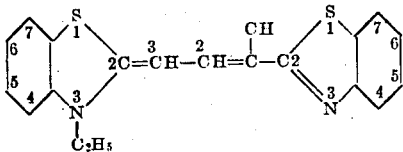

9.0 g. (1 mol.) of 2-(β-acetanilidovinyl)-benzothiazole ethiodide, 3.5 g. (1 mol.) of 2-benzothiazolylacetonitrile and 2.0 g. (1 mol.) of triethylamine were placed in 100 cc. of absolute ethyl alcohol. The mixture was boiled, under reflux, for 15 minutes. Blue crystals of base separated at once from the boiling mixture. The mixture was chilled, the base filtered off washed with methyl alcohol and dried in the air. Yield 6.4 g., 89%. After crystallization from acetone (100 cc. per gram of base), the base was obtained as red needles, having a silver reflex, and melting at 210° to 212° C. with decomposition. Yield 4.8 g., 67%. The base gave a pink solution in methyl alcohol. The base sensitized a gelatino-silver-bromiodide emulsion out to 600 mu with a maximum at 550 mu.

EXAMPLE 13.—2-[1-cyano-5-(3-ethyl-2(3)-benzothiazolylidene)-1,3-pentadienyl]-benzothiazole

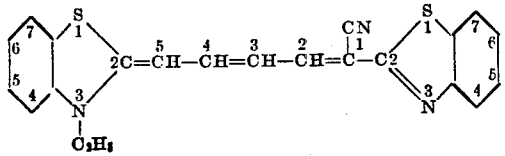

10.4 g. (1 mol.) of 2-(4-acetanilido-1,3-butadienyl)-benzothiazole etho-p-toluene-sulfonate, 3.5 g. (1 mol.) of 2-benzothiazolylacetonitrile and 2.0 g. (1 mol.) of triethylamine were placed in 100 cc. of absolute ethyl alcohol. The mixture was boiled, under reflux, for 15 minutes. Blue crystals of the base separated at once from the boiling solution. The mixture was chilled, the base filtered off, washed with methyl alcohol and dried in the air. The crude product was boiled with 200 cc. of methyl alcohol, filtered from the hot methyl alcohol and dried in the air. Yield of blue crystals was 5.5 g., 72%. After crystallization from acetone (150 cc. per gram of base), the base was obtained as blue needles, melting with decomposition at 205° to 206° C. Yield 5.2 g., 69%. The base gave a purple solution in methyl alcohol and sensitized a gelatino-silver-bromiodide emulsion fairly strongly to 700 mu with a maximum at 650 mu.

EXAMPLE 14.—2-[1 - cyano-5-(1 - ethyl - 2(1)-β-naphthothiazolylidene) - 1,3-pentadienyl]-benzothiazole

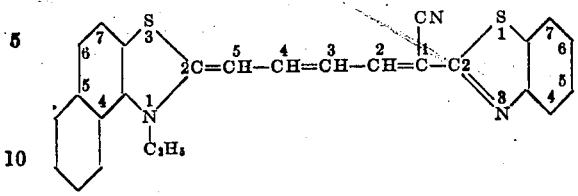

5.3 g. (1 mol.) of 2-(4-acetanilido-1,3-butadienyl)-β-naphthothiazole ethiodide, 1.74 g. (1 mol.) of 2-benzothiazolylacetonitrile and 1.0 g. (1 mol.) of triethylamine were placed in 100 cc. of absolute ethyl alcohol. The mixture was boiled, under reflux, for 15 minutes. The base separated at once from the boiling mixture. The mixture was chilled, the base filtered off, washed with methyl alcohol and dried in the air. Yield of dark crystals 3.5 g., 80%. After crystallization from pyridine (95 cc. per gram of base), the base was obtained as dull blue crystals melting with decomposition at 240° to 242° C. Yield 2.1 g., 48%. The base gave a blue solution in methyl alcohol and sensitized a gelatino-silver-bromiodide emulsion fairly strongly between about 560 mu and 710 mu with a maximum at 670 mu.

In a similar manner 2-(β-acetanilidovinyl)-3-phenylbenzothiazolium iodide can be condensed with 2-benzothiazolylacetonitrile to give 2-[1-cyano - 3-(3-phenyl - 2(3)-benzothiazolylidene) propenyl]-benzothiazole. 2-(β-acetanilidovinyl)-3-phenylbenzothiazolium iodide is described in the co-pending application of Leslie G. S. Brooker and William W. Williams, Serial No. 353,500, filed August 21, 1940 (now U. S. Patent 2,330,203, dated September 28, 1943).

In accordance with our invention dialkylaminostyryl and dialkylaminocinnamyl bases can be prepared by condensing dialkylaminobenzaldehydes or dialkylaminocinnamic aldehydes with heterocyclic nitrogen bases containing, in a reactive position, a cyanomethyl group. These condensations are advantageously effected in the presence of a water-binding agent, e. g. a water-binding agent comprising an anhydride of a monocarboxylic organic fatty acid. Alternatively these condensations are advantageously effected in the presence of a catalyst comprising essentially a strong secondary organic base, such as piperidine. When employing such a catalyst, the condensations are advantageously effected in a solvent, such as an alcohol of the formula $C_nH_{2n+1}OH$ wherein $n$ represents a positive integer of from one to three. Heat accelerates the condensations.

The following examples will serve to illustrate our new cyano dialkylaminostyryl and cyano dialkylaminocinnamyl bases and the manner of obtaining the same.

EXAMPLE 15.—4-[1 - cyano-(p - dimethylamino) styryl]quinoline

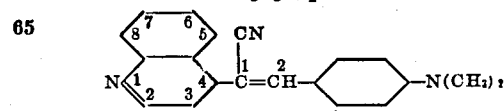

1.7 g. (1 mol.) of 4-quinolylacetonitrile and 3 g. (1 mol.+100% excess) of p-dimethylaminobenzaldehyde were placed in 15 cc. of acetic anhydride. The mixture was boiled, under reflux, for one hour. The brownish mixture was chilled to 0° C. when greenish yellow crystals of styryl base separated. These were filtered off and recrystallized from methyl alcohol (43 cc. per gram of base). The base was thus obtained, in 47% yield, as yellow flakes melting at 153° to 154° C. The base sensitized a gelatino-silver-bromiodide emulsion weakly out to 540 mu.

EXAMPLE 16.—*2-[1-cyano-4(p - dimethylamino)-1,3-utadienyl]benzothiazole*

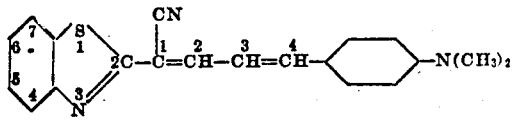

1.5 g. (1 mol.) of 2-benzothiazolylacetonitrile, 1.5 g. (1 mol.) of p-dimethylaminocinnamaldehyde and 10 drops of piperidine were placed in 25 cc. of absolute ethyl alcohol. The mixture was boiled, under reflux, for 10 minutes. The cinnamyl base separated at once from the boiling mixture. The orange mixture was chilled, the base filtered off, washed with methyl alcohol and dried in the air. Yield of minute dark crystals 2.3 g., 81%. After recrystallization from acetone (225 cc. per gram of base), the base was obtained, in 53% yield, as minute purple crystals, melting with decomposition at 226° to 228° C. The base sensitized a photographic gelatino-silver-bromiodide emulsion very weakly out to 640 mu, with considerable desensitization in the blue region. The base gave an orange solution in methyl alcohol.

Any of the cyano cyanine bases, cyano styryl bases or cyano cinnamyl bases of our invention can be converted into the corresponding dyes by quaternarization with alkyl salts. The following examples will serve to illustrate the manner of obtaining such dyes.

EXAMPLE 17.—*10-cyano-3-ethyl-1-methylthia-4'-carbocyanine bromide*

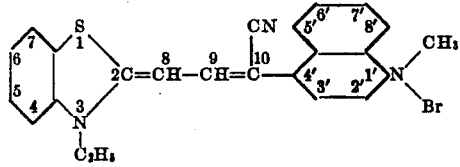

0.36 g. (1 mol.) 4-[1-cyano-3-(3-ethyl-2(3)-benzothiazolylidene) propenyl] quinoline and 0.4 g. (1 mol.+100%) of methyl-p-toluenesulfonate were heated together at 125° to 130° C. for about 2 hours. The green solid mass was cooled and stirred with diethyl ether. The solid residue was dissolved in 5 cc. of hot methyl alcohol. A hot aqueous solution of potassium bromide was added to the methyl alcoholic solution. The dye which precipitated was filtered off, washed with water and acetone and then dried in the air. After recrystallization from methyl alcohol (20 cc. per gram of dye) the dye was obtained as purple crystals with a bronze reflex and melting with decomposition at 262° to 263° C. The dye gave a bluish red solution in methyl alcohol. Yield 0.25 g., 55%. The dye sensitized a gelatino-silver-bromiodide emulsion weakly out to 650 mu with a maximum at 620 mu.

EXAMPLE 18.—*10-cyano-3,3'-diethylthiacarbocyanine iodide*

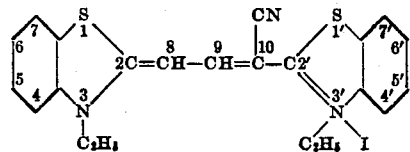

1.2 g. (1 mol.) of 2-[1-cyano-3-(3-ethyl-2(3)-benzothiazolylidene) propenyl]-benzothiazole and 1.5 g. (1 mol.+200% excess) of diethyl sulfate were heated together for 9 hours on a steam bath. After cooling, the mixture was washed by decantation with several 50 cc. portions of absolute diethyl ether. The washed mixture was then dissolved in 30 cc. of hot methyl alcohol. To the hot methyl alcoholic solution was added an excess of sodium iodide in methyl alcoholic solution. The dyeiodide precipitated. The dye was filtered off, washed with water, then with acetone and dried in the air. Yield of red crystals 1.1 g., 65%. After recrystallization from methyl alcohol (330 cc. per gram of dye), the dye was obtained as steel blue crystals melting with decomposition at 219° to 222° C. Yield 0.9 g., 53%. The dye gave a red solution in methyl alcohol. The dye sensitized a gelatino-silver-bromiodide emulsion out of 600 mu with a maximum at 550 mu.

Our new cyano bases can be represented by the following general formulas:

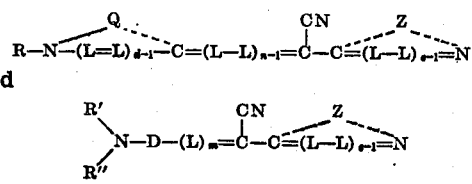

and

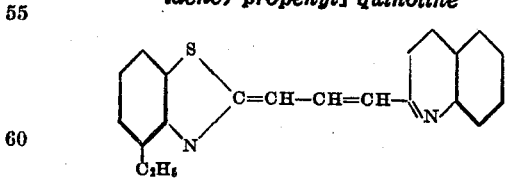

wherein $d$ and $e$ each represent a positive integer of from 1 to 2, $n$ represents a positive integer of from 1 to 4, $m$ represents a positive odd integer of from 1 to 3, D represents an arylene group, L represents a methine group, R represents an organic radical selected from the group consisting of alkyl and aryl groups, R' and R" each represent an alkyl group and Q and Z each represent the non-metallic atoms necessary to complete a heterocyclic nucleus.

In accordance with our invention, the cyano cyanine bases, cyano styryl bases or cyano cinnamyl bases are hydrolyzed to the corresponding unsubstitute bases. During the hydrolysis, the cyano group is converted to a carboxyl group which loses carbon dioxide. The hydrolysis is advantageously effected with an acid hydrolysis catalyst. Mineral acids are advantageously employed as acid hydrolysis catalysts. Heat accelerates the hydrolysis.

The following examples will serve to illustrate the manner of obtaining unsubstituted bases from the cyano bases.

EXAMPLE 19.—*2-[3-(3-ethyl-2(3)-benzothiazolylidene) propenyl] quinoline*

1.0 g. of 2-[1-cyano-3-(3-ethyl-2(3)-benzothiazolylidene) propenyl] quinoline was placed in 50 cc. of 60% sulfuric acid. The mixture was heated to boiling, under reflux. A vigorous evolution of carbon dioxide occurred at the boiling point. The mixture was boiled until the evolution of carbon dioxide ceased (about 5 minutes). The mixture was then poured onto ice and made alkaline with ammonium hydroxide. The orange precipitate was filtered off, washed with water and dried. In this manner 0.9 g., 97% yield, of greenish solid was obtained. After recrystallization from absolute ethyl alcohol (17 cc. per gram of base), the base was obtained as a brown powder, melting with decomposition at 126° to 127° C. Yield 0.65 g., 70%. The base sensitized a photographic gelatino-silver-bromiodide emulsion very weakly out to 640 mu.

In a similar manner 4-[3-(3-ethyl-2(3)-benzothiazolylidene) propenyl] quinoline was prepared from 4- 1-cyano-3-(3-ethyl-2(3)-benzothiazolylidene) propenyl quinoline. The base was obtained after recrystallization from ethyl alcohol (140 cc. per gram of base) as glistening orange needles, melting with decomposition at 195° to 196° C. The base sensitized a photographic gelatino-silver-bromiodide emulsion weakly out to 640 mu.

EXAMPLE 20.—*4-[5-(3-ethyl-2(3)-benzothiazolylidene)-1,3-pentadienyl] quinoline*

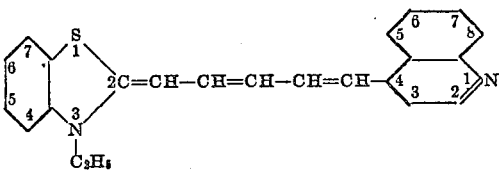

0.6 g. of 4-[1-cyano-5-(3-ethyl-2(3)-benzothiazolylidene)-1,3-pentadienyl] quinoline were placed in 30 cc. of 60% sulfuric acid. The mixture was boiled, under reflux, for one minute. The solution was then cooled, poured onto ice, and made alkaline with ammonium hydroxide. The cyanine base was filtered off. Yield of greenish solid was 0.5 g., 89%. The base was recrystallized from methyl alcohol (100 cc. per gram of base), and obtained, in 36% yield, as a dull red powder, melting with decomposition at 187° to 189° C. The base had no sensitizing action on photographic silver halide emulsions.

EXAMPLE 21.—*2-[(1-ethyl-4(1)-quinolylidene) methyl]-quinoline*

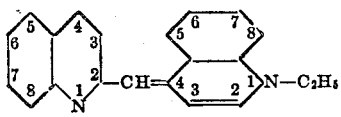

2 g. of 2-[cyano-(1-ethyl-4(1)-quinolylidene) methyl] quinoline hydrochloride were placed in 75 cc. of 60% sulfuric acid. The mixture was boiled, under reflux, for 5 minutes. The mixture was then cooled, poured onto ice and made alkaline with ammonium hydroxide. The cyanine base was filtered off. Yield 1.6 g., 97%. After recrystallization from absolute ethyl alcohol (17 cc. per gram of base), the base was obtained as red crystals having a greenish reflex and melting at 110° to 111° C. with decomposition. Yield 1.2 g., 73%. The base had a very slight sensitizing action on photographic silver halide emulsions.

EXAMPLE 22.—*2-[5-(3-ethyl-2(3)-benzothiazolylidene)-1,3-pentadienyl]-quinoline*

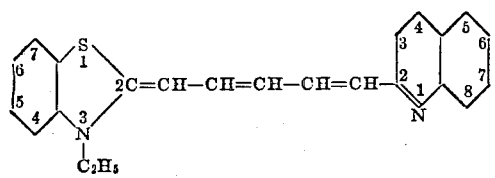

4.2 g. of 2-[1-cyano-5-(3-ethyl-2(3)-benzothiazolylidene)-1,3-pentadienyl]-quinoline were placed in 150 cc. of 60% sulfuric acid. The mixture was boiled, under reflux, for 5 minutes. The mixture was cooled, poured onto ice, and made alkaline with ammonium hydroxide. The crude cyanine base was filtered off. It was contaminated with considerable insoluble colorless material. The crude product was extracted with 100 cc. of absolute ethyl alcohol. Upon chilling the alcoholic extract red crystals of cyanine base separated. These were filtered off and recrystallized from absolute ethyl alcohol (65 cc. per gram of base) and obtained as minute red crystals melting at 142 to 144° C. with decomposition. Yield 1.2 g., 31%. The base sensitized a photographic gelatino-silver-bromiodide emulsion fairly strongly between about 560 mu and 760 mu with a maximum at about 710 mu.

In a similar manner, 2-[5-(1-ethyl-2(1)-quinolylidene)-1,3-pentadienyl] benzothiazole was obtained as a dull black powder melting with decomposition at 153° to 155° C., from 2-[1-cyano-5-(1-ethyl-2(1)-quinolylidene)-1,3-pentadienyl] benzothiazole.

EXAMPLE 23.—*2 - [4 - (p-dimethylaminophenyl)-1,3-butadienyl] benzothiazole)*

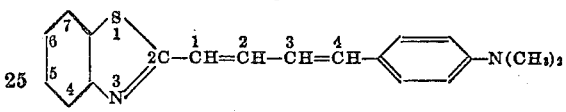

2.0 g. of 2-[1-cyano-4-(p-dimethylaminophenyl)-1,3-butadienyl] benzothiazole and 150 cc. of 60% sulfuric acid were mixed together. The mixture was boiled, under reflux, until evolution of carbon dioxide ceased (about 5 minutes). The mixture was then cooled rapidly and poured onto a mixture of crushed ice and water containing ammonium hydroxide in excess of that required to neutralize the sulfuric acid. The base precipitated. It was filtered off, washed with water and dried in the air. Yield of green crystals was 0.7 g., 38%. The base was recrystallized from methyl alcohol (500 cc. per gram of base) and obtained, in 27% yield, as greenish crystals melting with decomposition at 173° to 175° C. Its methyl alcoholic solution was yellow. It sensitized a photographic silver halide emulsion very slightly.

EXAMPLE 24.—*2 - [7 - (3-ethyl-2(3)-benzothiazolylidene)-1,3,5-heptatrienyl] benzothiazole*

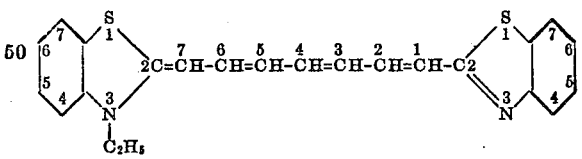

1.0 g. of 2-[1-cyano-7-(3-ethyl-2(3)-benzothiazolylidene)-1,3,5-heptatrienyl] benzothiazole and 100 cc. of 60% sulfuric acid were mixed together. The mixture was boiled, under reflux, until evolution of carbon dioxide ceased (about 3 minutes). The mixture was cooled rapidly and poured onto a mixture of crushed ice and water containing ammonium hydroxide in excess of that required to neutralize the sulfuric acid. The base precipitated. It was filtered off, washed with water and dried in the air. Yield .4 g., 43%. After recrystallization from acetone (800 cc. per gram of base), the base was obtained as dull black crystals, melting with decomposition at 141° to 142° C. Yield 0.3 g., 32%. Solution in methyl alcohol was red. Gave no sensitizing action on a photographic silver halide emulsion.

In the preparation of photographic emulsions sensitized with the herein described bases, it is only necessary to disperse the bases in the emulsions. It is convenient to add the bases to the emulsions from solutions in appropriate solvents. Acetone and methyl alcohol have proven satisfactory as solvents for this purpose. Sensitization by means of these bases is, of course, primarily directed to the ordinarily employed gelatino-silver-halide developing-out emulsions. The bases are ordinarily incorporated in the washed, finished emulsions and should, of course, be uniformly distributed throughout the emulsion. The concentration of the bases in the emulsions can vary widely, i. e. from about 5 to about 100 mg. per liter of flowable emulsions. The concentration of the base will vary according to the type of light-sensitive material in the emulsion and according to the effect desired. The suitable and most economical concentration for any given emulsion will be apparent to those skilled in the art upon making the ordinary tests and observations customarily employed in the art of emulsion making. To prepare a gelatino-silver-halide emulsion sensitizing with one of these bases, the following procedure is satisfactory. A quantity of the base is dissolved in acetone or other suitable solvent, and a volume of this solution (it may be diluted with water) containing from 5 to 100 mg. of base is slowly added to about 1000 cc. of gelatino-silver-halide emulsion, with stirring. Stirring is continued until the base is uniformly distributed throughout the emulsion. With most of these sensitizing bases, 10 to 20 mg. of base per liter of emulsion suffices to produce the maximum sensitizing effect with the ordinary gelatino-silver-bromide (including bromiodide) emulsions. With gelatino-silver-chloride emulsions somewhat larger concentrations are required to produce the optimum sensitizing effect. The above statements are only illustrative and are not to be understood as limiting our invention, as it will be apparent that these bases can be incorporated by other methods in the photographic silver halide emulsions customarily employed in the art. For instance, the bases may be incorporated by bathing a plate or film upon which an emulsion has been coated in a solution of the base in an appropriate solvent. Bathing methods, however, are not to be preferred ordinarily.

This application is a division of our copending application Serial No. 389,224, filed April 18, 1941.

What we claim as our invention and desire to be secured by Letters Patent of the United States is:

1. A process for preparing a cyanine base comprising hydrolyzing, in the presence of an acid hydrolysis catalyst, a cyano base of the following general formula:

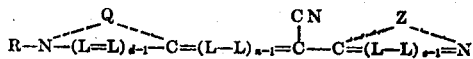

wherein $d$ and $e$ each represents a positive integer of from 1 to 2, $n$ represents a positive integer of from 1 to 4, L represents a methine group, R represents an organic radical selected from the group consisting of alkyl and aryl groups, and Q and Z each represents the non-metallic atoms necessary to complete a heterocyclic organic nucleus.

2. A process for preparing a cyanine base comprising hydrolyzing, in the presence of a mineral acid hydrolysis catalyst, a cyano base of the following general formula:

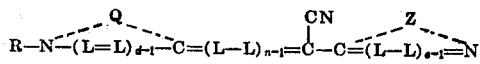

wherein $d$ and $e$ each represents a positive integer of from 1 to 2, $n$ represents a positive integer of from 1 to 4, L represents a methine group, R represents an organic radical selected from the group consisting of alkyl and aryl groups, and Q and Z each represents the non-metallic atoms necessary to complete a heterocyclic organic nucleus.

3. A process for preparing a cyanine base comprising hydrolyzing, in the presence of a sulfuric acid hydrolysis catalyst, a cyano base of the following general formula:

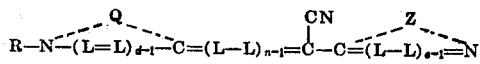

wherein $d$ and $e$ each represents a positive integer of from 1 to 2, $n$ represents a positive integer of from 1 to 4, L represents a methine group, R represents an organic radical selected from the group consisting of alkyl and aryl groups, and Q and Z each represents the non-metallic atoms necessary to complete a heterocyclic organic nucleus.

4. A process for preparing a tricarbocyanine base comprising hydrolyzing, in the presence of an acid hydrolysis catalyst, a tricarbocyanine base having the following formula:

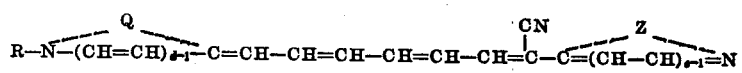

wherein $d$ and $e$ each represents a positive integer of from 1 to 2, R represents an alkyl group and Q and Z each represents the non-metallic atoms necessary to complete a heterocyclic nucleus.

5. A process for preparing a tricarbocyanine base comprising hydrolyzing, in the presence of a mineral acid hydrolysis catalyst, a tricarbocyanine base having the following formula:

wherein $d$ and $e$ each represents a positive integer of from 1 to 2, R represents an alkyl group and Q and Z each represents the non-metallic atoms necessary to complete a heterocyclic nucleus.

6. A process for preparing a tricarbocyanine base comprising hydrolyzing, in the presence of a sulfuric acid hydrolysis catalyst, a tricarbocyanine base having the following formula:

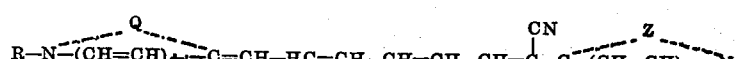

wherein $d$ and $e$ each represents a positive integer of from 1 to 2, R represents an alkyl group and Q and Z each represents the non-metallic atoms necessary to complete a heterocyclic nucleus.

7. A process for preparing a dicarbocyanine base comprising hydrolyzing, in the presence of an acid hydrolysis catalyst, a dicarbocyanine base having the following formula:

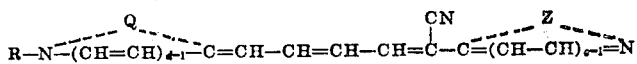

wherein $d$ and $e$ each represents a positive integer of from 1 to 2, R represents an alkyl group and Q and Z each represents the non-metallic atoms necessary to complete a heterocyclic nucleus.

8. A process for preparing a dicarbocyanine base comprising hydrolyzing, in the presence of a mineral acid hydrolysis catalyst, a dicarbocyanine base having the following formula:

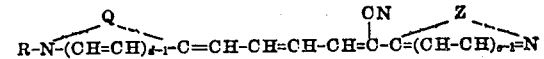

wherein $d$ and $e$ each represents a positive integer of from 1 to 2, R represents an alkyl group and Q and Z each represents the non-metallic atoms necessary to complete a heterocyclic nucleus.

9. A process for preparing a dicarbocyanine base comprising hydrolyzing, in the presence of a sulfuric acid hydrolysis catalyst, a dicarbocyanine base having the following formula:

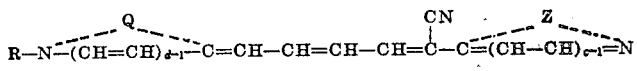

wherein $d$ and $e$ each represents a positive integer of from 1 to 2, R represents an alkyl group and Q and Z each represents the non-metallic atoms necessary to complete a heterocyclic nucleus.

10. A process for preparing a carbocyanine base comprising hydrolyzing, in the presence of an acid hydrolysis catalyst, a carbocyanine base having the following formula:

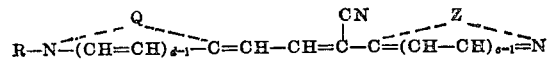

wherein $d$ and $e$ each represents a positive integer of from 1 to 2, R represents an alkyl group and Q and Z each represents the non-metallic atoms necessary to complete a heterocyclic nucleus.

11. A process for preparing a carbocyanine base comprising hydrolyzing, in the presence of a mineral acid hydrolysis catalyst, a carbocyanine base having the following formula:

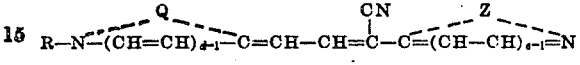

wherein $d$ and $e$ each represents a positive integer of from 1 to 2, R represents an alkyl group and Q and Z each represents the non-metallic atoms necessary to complete a heterocyclic nucleus.

12. A process for preparing a carbocyanine base comprising hydrolyzing, in the presence of a sulfuric acid hydrolysis catalyst, a carbocyanine base having the following formula:

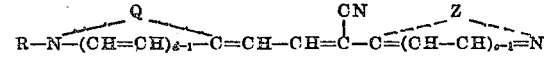

wherein $d$ and $e$ each represents a positive integer of from 1 to 2, R represents an alkyl group and Q and Z each represents the non-metallic atoms necessary to complete a heterocyclic nucleus.

LESLIE G. S. BROOKER.
ROBERT H. SPRAGUE.